United States Patent [19]

Kanekawa et al.

[11] Patent Number: 5,612,946
[45] Date of Patent: Mar. 18, 1997

[54] ELECTRICAL DEVICE WITH INPUT AND OUTPUT PORTS FOR CHANGING THE MULTIPLEX NUMBER OF TRANSMITTAL BUSES AND SYSTEM USING THE ELECTRICAL DEVICE

[75] Inventors: Nobuyasu Kanekawa; Shoji Suzuki; Yoshimichi Sato; Shinya Ohtsuji, all of Hitachi, Japan

[73] Assignee: Hitachi, Ltd., Tokyo, Japan

[21] Appl. No.: 493,662

[22] Filed: Jun. 22, 1995

[30] Foreign Application Priority Data

Jul. 4, 1994 [JP] Japan .................................. 6-152322

[51] Int. Cl.⁶ .................................................. H04L 12/26
[52] U.S. Cl. ......................... 370/216; 371/68.1; 371/37.1
[58] Field of Search ............................... 370/14, 15, 16, 370/24, 13; 395/182.02, 182.08, 182.09, 182.22, 183.13; 371/67.1, 20.4, 20.5, 68.1, 37.1; 375/221, 224

[56] References Cited

U.S. PATENT DOCUMENTS

| | | | |
|---|---|---|---|
| 5,029,071 | 7/1991 | Kinoshita ........................... | 395/189.09 |
| 5,086,499 | 2/1992 | Mutone .............................. | 395/182.08 |
| 5,157,663 | 10/1992 | Major et al. ...................... | 395/182.08 |
| 5,249,187 | 9/1993 | Bruckert et al. .................. | 395/182.09 |

FOREIGN PATENT DOCUMENTS

| | | |
|---|---|---|
| 0287302 | 10/1988 | European Pat. Off. . |
| 0301500 | 2/1989 | European Pat. Off. . |
| 4041235 | 2/1990 | Germany . |

OTHER PUBLICATIONS

"A 32–bit Fail Safe MPU board" by Masayuki UMEYAMA, Japan Signal Technique Report, vol. 16, No. 3, pp. 11–16 (1992).

"Development of a 32–bit Fail Safe FPU" by Noboru ASANO, Traffice Electronics and Rail Way Research Committee Report of the Institute of Electrical Engineer of Japan TER–92–35, pp. 31–41 (1992).

Elektronik, vol. 35, No. 25, 12 Dec. 1986, München, DE, Kuntz W., et al.: *Integrierte Schaltungen mit Fail–Safe–Eigenschaften.*

*Primary Examiner*—Douglas W. Olms
*Assistant Examiner*—Ajit Patel
*Attorney, Agent, or Firm*—Kenyon & Kenyon

[57] ABSTRACT

The same electrical device can be used in two modes, a simplex bus connection mode and a duplex bus connection mode, by collating signals output from two input and output ports for two electrical circuits in an electrical device with a comparator and detecting a fault in the electrical circuits in a duplex bus connection mode, and by checking whether a normal signal is output from an input and output port by collating a signal output from one input and output port for one of the two electrical circuits with the output signal fed back via another input and output port in a simplex bus connection mode.

19 Claims, 5 Drawing Sheets

ELECTRICAL DEVICE WITH INPUT AND OUTPUT PORTS FOR CHANGING THE MULTIPLEX NUMBER OF TRANSMITTAL BUSES AND SYSTEM USING THE ELECTRICAL DEVICE

BACKGROUND OF THE INVENTION

1. Field of the Invention

The present invention relates to an electrical device securing the normality of its output signals, particularly to such a system using the electrical device suitable for composing an input and output terminal or a transmittal terminal of a high reliability system as a fault tolerant system.

2. Description of the Related Art

The first conventional method for constructing a fail safe system is popularly realized by detecting faults in an electrical device or an electrical circuit adapting a self-checking methodology and realizing continuous operations of the fail safe system by changing the configuration of the system based on the fault detecting results.

Examples of such an approach are disclosed in the following references.

(1) "A 32-bit Fail Safe MPU Board" by Masayuki Umeyama,

Japan Signal Technique Report, Vol. 16, No. 3, pp. 11–16 (1992)

(2) "Development of A 32-bit Fail Safe CPU" by Noboru Asano, Traffic Electronics and Rail Way Research Committee Report of The Institute of Electrical Engineer of Japan, TER-92-35, pp. 31–41 (1992).

The disclosed methods for realizing a fail safe function detect faults in circuits by using a duplicated circuit such as a memory or a micro-processor and collating signals on buses connected to the duplicated circuit.

Then, as in the second reference, a method of feeding back output signals and collating the output signals and signals to be output, is popularly used to secure the normality of the output signals.

The above-mentioned conventional techniques disclosed in the Japan Signal Technique Report and the Traffic Electronics and Rail Way Research Committee Report of The Institute of Electrical Engineer of Japan, are effectual in the points that those techniques can be easily realized by using general purpose micro-processors or memories. However, the convenience of connection with an outer circuit is not much regarded in the techniques. In the above-mentioned techniques, it is required to use a duplex circuit as a circuit to be connected to a self-checking circuit. However, although a circuit synchronizing with a processor, such as a memory, can be simply duplicated and dealt with logically as a simple circuit, such a circuit operating asynchronously with a processor as a transmission interface connected with an outer circuit disturbs the synchronization of a whole system, only by simply duplicating the circuit. Then, as for such a circuit, it is desirable to provide two logically different circuits or devices, but it is not always necessary to connect such a circuit to an outer duplex bus as shown FIG. 7. And many of conventional transmission interfaces are designed so as to be connected to a non duplex bus (hereinafter called as a simplex bus) and can not be connected to a duplex bus as shown FIG. 7. Then, since error correcting detection of output signals is possible if error correcting codes are added to signals output to a bus, duplication of an outer bus is not always necessary.

The conventional output collating method of feeding back output signals is an excellent one for securing the normality of output signals. And, particularly, the method can detects a fault such as disconnection of a wire, a contact failure, etc., as to output signals of a circuit on a wired board, and a fault such as an inferior wire-bonding, an inferior soldering of a pin (or a lead), etc., as to a circuit in a semiconductor package. However, in the method, a counter-measure to increasing of the required points of contact or terminals of pins (or leads) is not much regarded yet. Then, the same number of terminals for the feedback as that for output signals is needed for feeding back the output signals. For example, totally terminals are necessary in the method for an address signal of 32 bits and a data signal of 32 bits. Further, if an outer bus is duplicated as mentioned above, 256 terminals are necessary. Especially, in such a system, an increasing of terminals in a semiconductor device causes an increase of a chip size or a package size which causes in its turn an increase of a failure rate besides weight and volume of a device.

Further, since a use of an electrical device having a self-checking function is restricted to a special field and the mass production effects are not large, a cost of a device becomes very high if design and production is individually done for each device for adapting the device to a simplex bus or a duplex bus.

SUMMARY OF THE INVENTION

The present invention offers an electrical device or a system using the electrical device, capable of corresponding to both a simplex bus and a multiplex bus.

Additionally, the invention offers an electrical device capable of corresponding to both buses of a simplex bus and a multiplex bus or a fault tolerant system using the electrical device, capable of securing the normality of output signals without increasing of the terminal number.

One of features of the present invention is that an electrical device according to the present invention has such input and output parts in a number corresponding to the number of buses connected to the input and output ports, that the same signals are output from the input and output ports to the multiplex bus if the input and output ports are connected to a multiplex bus. And if the input and output ports are connected to a simplex bus, at least one pair of the input output ports are connected each other, and a signal is output from one of the input and output ports, and the output signal is collated with the signal to be output, by feeding back the output signal from another one of the input and output ports, when outputting signals.

Another one of features of the present invention is that an electrical device according to the present invention has such two input and output ports connected to buses having the same specification that the same signals are output from the two input and output ports if the input and output ports are connected to a duplex bus, and if the two input and output ports are connected to a simplex bus, the terminals of the two input and output ports are connected each other, a signal is output from one of the input and output ports and the output signal is collated with the signal to be output, by feeding back the output signal from another one of the two the input and output ports, when outputting signals.

By the above-mentioned features, if the input and output parts are connected to a duplex bus or a multiplex bus, the signals output on the buses are collated and the normality of signals output from the input and output port are secured by confirming the agreement among the collated signals.

Further, if the input and output port are connected to a simplex bus, the normality of signal output from the input and output part is secured by feeding back an output signal and collating the output signal with the fed back output signal.

Furthermore, since another one of the input and output ports connected to a duplex bus, except one of the input and output ports being used to output signals to the bus, is used for the signal feedback, it is possible to feed back the output signals without increasing the number of terminals in the input and output ports.

DETAILED DESCRIPTION

Hereinafter, embodiments of the present invention are explained reference to drawings.

Figure 1:
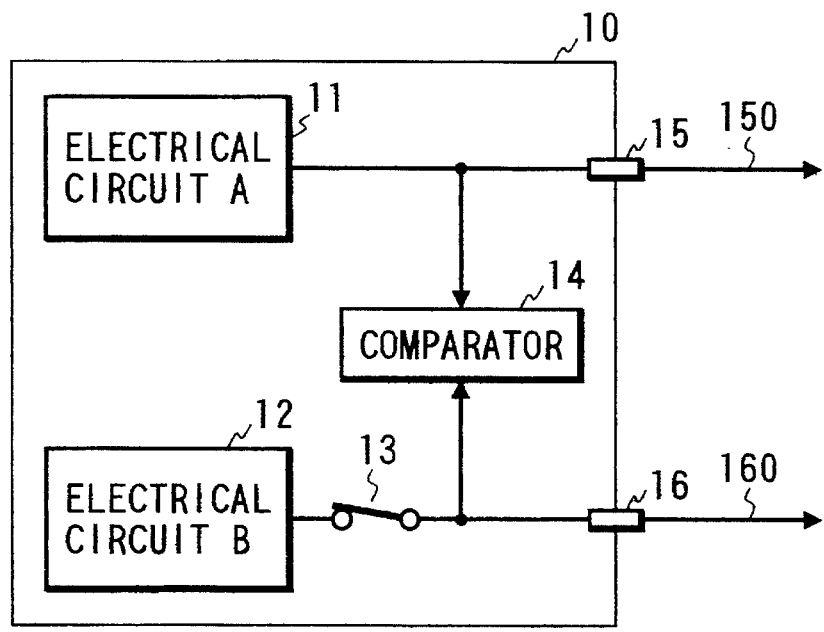
FIG. 1 is a diagram showing a fundamental embodiment of the present invention for the duplex bus connection mode.
Figure 2:
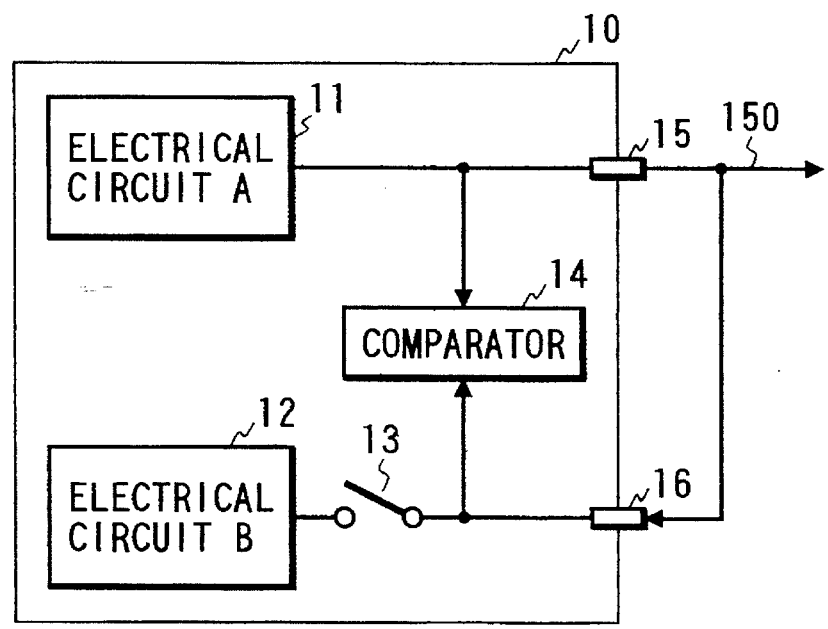
FIG. 2 is a diagram showing a fundamental embodiment of the present invention for the simplex bus connection mode.

In FIGS. 1 and 2, the fundamental concept of the present invention is shown. FIG. 1 shows an electrical device 10 according to an embodiment of the present invention, which, for example, is connected to two buses 150 and 160 in an outer duplex bus and includes duplicated electrical circuits ( CPU, I/O(input and output terminal), etc.) 11 and 12. Outputs of the electrical circuits 11 and 12 are connected to the buses 150 and 160 via input and output terminals 15 and 16, respectively. The two outputs of the electrical circuits 11 and 12 are collated by a comparator 14, and the comparator 14 detects a fault occurring in one of the two electrical circuits 11 and 12 as the disagreement between the two outputs and provides external the fault indication of occurrence.

FIG. 2 shows an electrical device 10 of another embodiment of the present invention, in which input and output terminals 15 and 16 are connected to a bus 150 in an outer simplex bus, an internal switch of 13 the electrical device 10 being opened in outputting signals to the bus 150 and closed in inputting signals from the bus 150. By the embodiment, the signals output to the bus 150 are fed back via the input and output terminal 16 and collated with the signal to be output at the output of the electrical circuit 11 by the comparator 14. Then, by the collating results of the comparator 14 it is assured that signals are normally output from the input and output terminal 15 to the bus 150.

Figure 3:
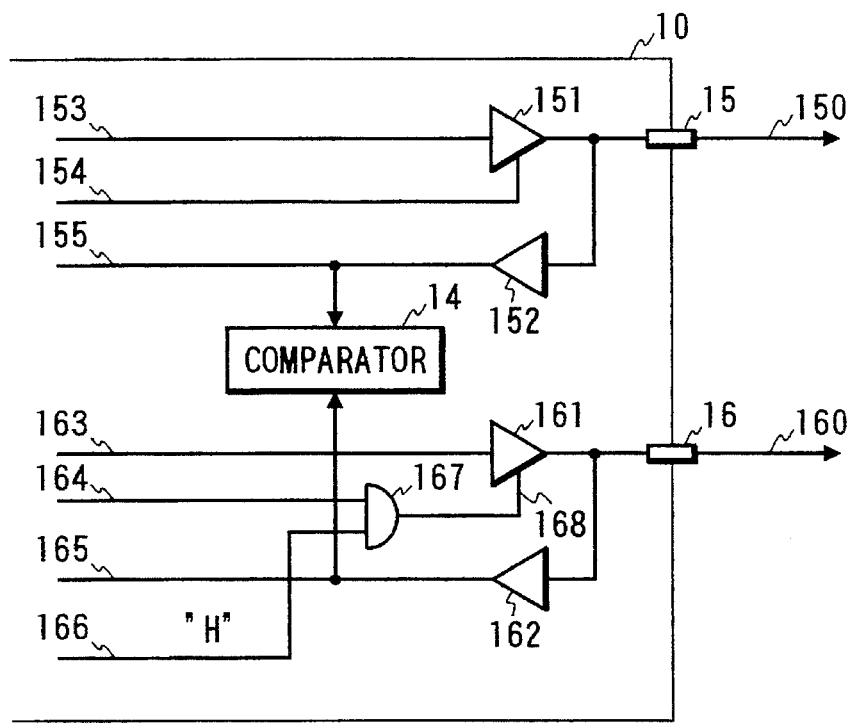
FIG. 3 shows the constitution of an interface part for the duplex bus connection mode.
Figure 4:
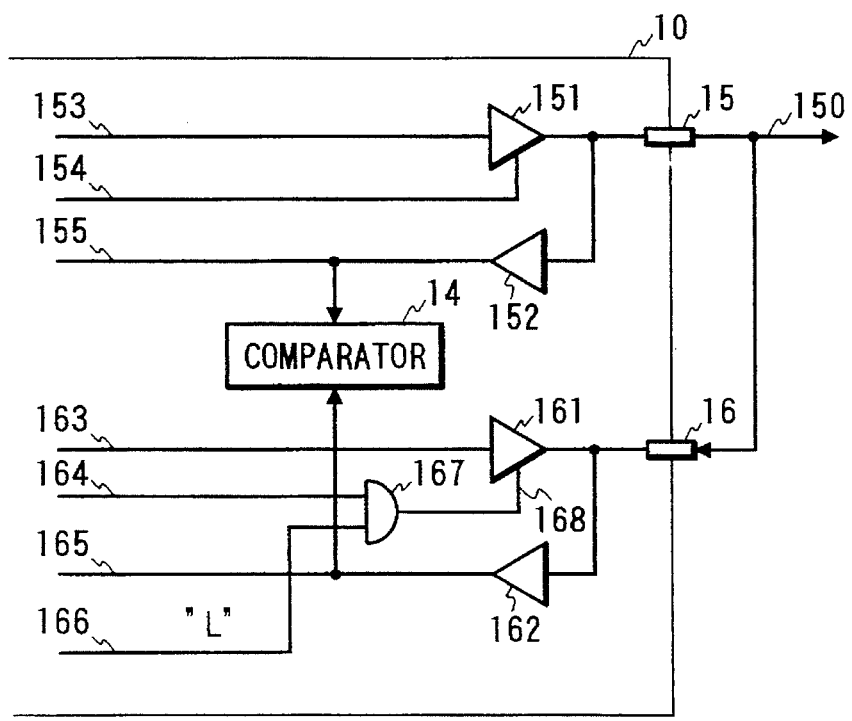
FIG. 4 shows the constitution of an interface part for the simplex bus connection mode.

FIGS. 3 and 4 are diagrams showing composition of an interface part with the outer buses, in an embodiment according to the present invention. FIG. 3 is a diagram of an example showing the composition in which the electrical device 10 is connected to the buses 150 and 160 of the outer duplex bus and a mode switching signal 166 is set to H level. The output signal 153 of the electrical circuit 11 is output to the bus 150 from a tri-state buffer 151 via the input and output terminal 15. The tri-state buffer 151 is controlled by an input and output control signal 154. The input and output control signal 154 from the electrical circuit 11 is set to H level and the state of the tri-state buffer 151 becomes enabled, in outputting signals. In inputting signals, the input and output control signal 154 is set to L level and the state of the tri-state buffer 151 become disabled, namely, a high impedance state. Then, the electrical circuit 11 can take in signals on the bus 150 by using a signal line 155 via an input buffer 152.

The output signal 163 from the electrical circuit 12 is output from a tri-state buffer 161 to the bus 160 via the input and output terminal 16. The tri-state buffer 161 is controlled by an input and output control signal 164 as explained below. In outputting signals, an output 168 of an AND gate 167 becomes H level state since the input and output control signal 164 from the electrical circuit 12 is set to H level and a mode switching signal 166 is set to H level, and then the state of the tri-state buffer 161 becomes enabled. In inputting signals, the output 168 of the AND gate 167 becomes L level state since the input and output control signal 164 is set to L level, and then the state of the tri-state buffer 161 becomes disabled, namely, a high impedance state. Then, the electrical circuit 12 can take in signals on the bus 160 by using a signal line 165 via an input buffer 162.

By the embodiment, in outputting signals, the comparator 14 can monitor operations of the electrical circuits 11 and 12 by collating the signals output from the tri-state buffers 152 and 162 via the input buffers 152 and 162. And, in inputting signals, operations of an outside electrical device outputting signals to the buses 150 and 160 can be monitored by collating the signals on the buses 150 and 160.

FIG. 4 is a diagram showing an example in which the electrical device 10 is connected to an outer simplex bus 150. In the case, this mode switching signal 166 is set to L level. The electrical circuit 11 can transmit signals with the outer simplex bus 150. And the output 168 of the AND gate 167 always becomes a L level state since the mode switching signal 166 is set to L level, and then the state of the tri-state buffer 161 always is disabled, namely, a high impedance state. Therefore, the input and output terminal 16 is used exclusively for inputting signals. In outputting signals, signals output from the input and output terminal 15 to the bus 150 appear as the output 165 of the input buffer 162. In inputting signals, signals input to the bus 150 appear as the output 165 of the input buffer 162. Then, the electrical circuit 12 can take in signals on the bus 150 by using a signal line 165 via an input buffer 162.

By the embodiment, the comparator 14 can assure that signals from the electrical circuit are normally output to the bus 150, by collating the outputs of the tri-state buffer 151 with the signals output on the bus 150, in outputting signals. And, in inputting signals, operations of an outside electrical device outputting signals to the buses 150 and 160 can be monitored by collating the signals on the buses 150 and 160.

In an example shown by FIG. 4, only the collation by the feedback of the signal output on the bus 150 in outputting signals is explained for simple explanation. However, it is more desirable to make it possible that operations of the electrical circuits 11 and 12 are monitored besides the collation by the feedback of the signal output on the bus 150, by increasing the number of comparators. Examples of increasing of comparators are shown in FIGS. 5 and 6.

Figure 5:
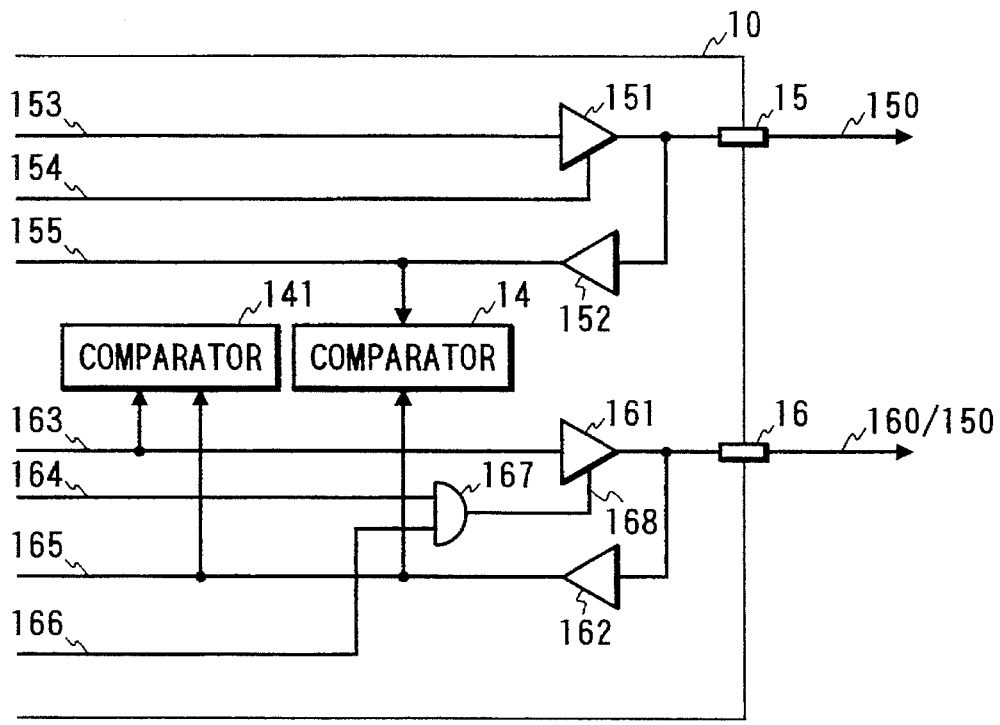
FIG. 5 shows an example of a way of correcting comparators.

FIG. 5 shows an embodiment in which the comparator 14 is inserted between the signal lines 155 and 165, and a comparator 141 between the signal lines 163 and 165. In the duplex bus connection mode of the embodiment, the comparator 14 monitors operations of the electrical circuits 11 and 12 in outputting signals, and operations of an outside electrical device outputting signals to the buses 150 and 160 by collating the signals on the buses 150 and 160 in inputting signals.

And, in the simplex bus connection mode, the comparator 14 assures that signals from the electrical circuit are normally output to the bus 150, by collating the outputs of the tri-state buffer 151 with the signals output on the bus 150, and then the comparator 141 monitors operations of the electrical circuits 11 and 12 by collating the signals 165 output on the bus 150 from the electrical circuit 11 with the output signals from the electrical circuit 12, in outputting signals. And the comparator 14 monitors operations of an outside electrical device outputting signals to the buses 150 and 160 by collating the signals on the buses 150 and 160 in inputting signals.

Figure 6:
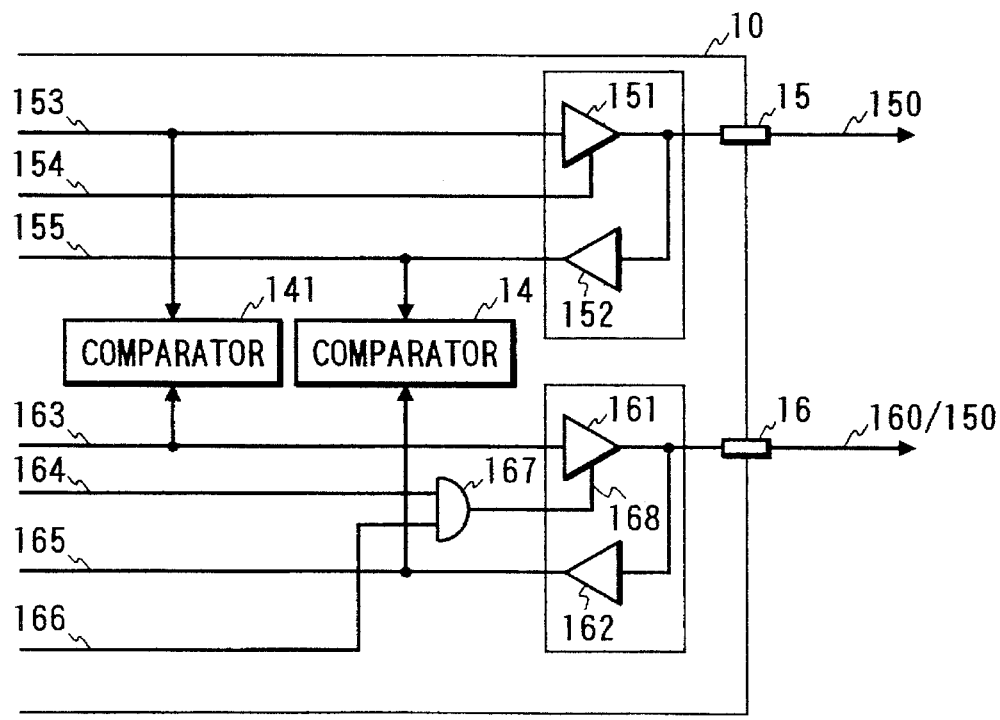
FIG. 6 shows another example of a connection way of comparators.

FIG. 6 shows an embodiment in which the comparator 141 is inserted between the signal lines 153 and 163, and a comparator 14 is inserted between the signal lines 155 and 165. In the duplex bus connection mode of the embodiment, the comparators 141 and 14 monitor operations of the electrical circuits 11 and 12 in outputting signals, and operations of an outside electrical device outputting signals to the buses 150 and 160 by collating the signals on the buses 150 and 160 in inputting signals.

And, in the simplex bus connection mode, the comparator 14 assures that signals from the electrical circuit are normally output to the bus 150, by collating the outputs of the tri-state buffer 151 with the signals 165 output on the bus 150, and then the comparator 141 monitors operations of the electrical circuits 11 and 12 by collating the signals 153 from the electrical circuit 11 with the output signals 163 from the electrical circuit 12, in outputting signals. And the comparator 14 monitors operations of an outside electrical device outputting signals to the buses 150 and 160 by collating the signals on the buses 150 and 160 in inputting signals.

Although there exist other applicable ways of connecting comparators besides the examples shown in FIGS. 3 to 6, such comparators all operate in the same ways as mentioned above.

Figure 7:
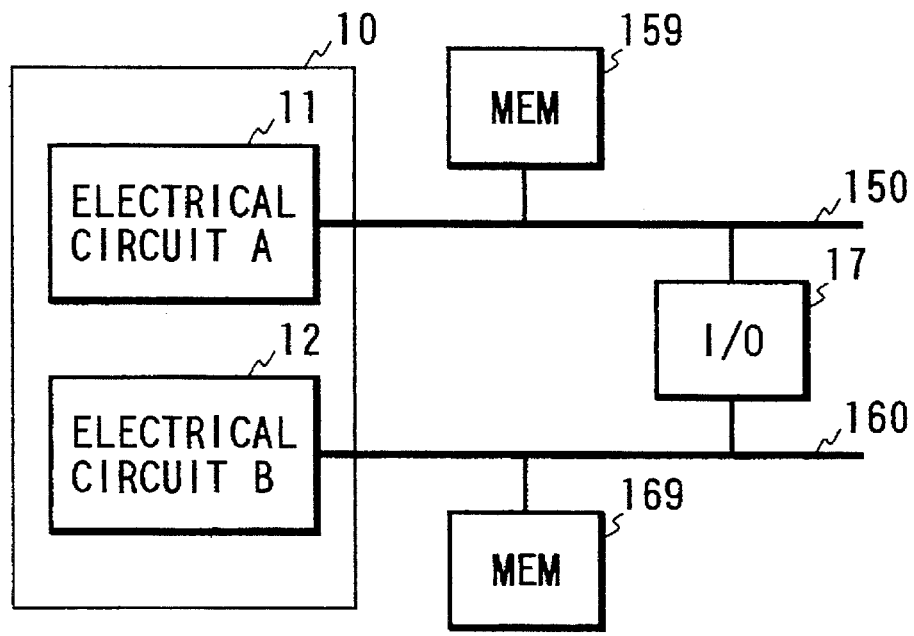
FIG. 7 is a diagram showing the constitution of an example of a self-checking system to which the embodiment of the present invention is applied.
Figure 8:
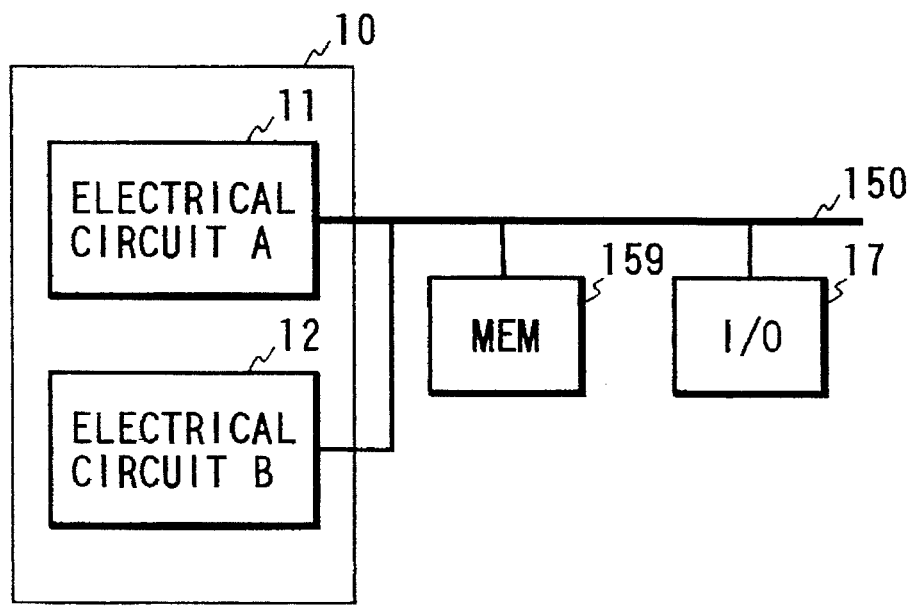
FIG. 8 is a diagram showing the constitution of another example of a self-checking system to which the embodiment of the present invention is applied.

FIGS. 7 and 8 show examples of self-checking systems using the electrical device 10 of the above-mentioned embodiment by the present invention.

If the electrical device 10 of the above-mentioned embodiment is connected to the buses 150 and 160 of an outer duplex bus, the electrical device 10 is used by in the duplex bus connection mode, that is, the mode switching signal 166 is set to H level, as shown by FIG. 3. In the embodiment, memories 159 and 169 are connected to the buses 150 and 160, respectively, and the both systems operate synchronously. An I/O interface 17 such as a transmittal interface with outside devices is connected to the buses 150 and 160.

If the electrical device 10 of the above-mentioned embodiment is connected to a simplex bus 150, the electrical device 10 is used in the simplex bus connection mode, that is, the mode switching signal 166 is set to L level, as shown by FIG. 4.

Figure 9:
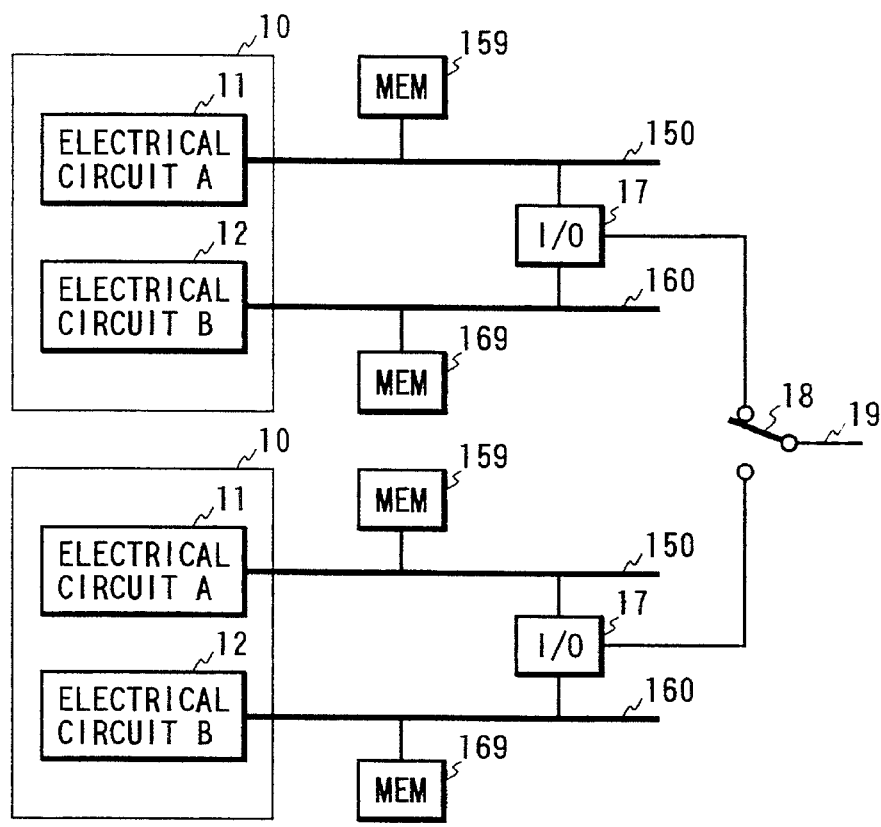
FIG. 9 is a diagram showing the constitution of an example of a continuous operation type fault tolerant system to which the embodiment of the present invention is applied.
Figure 10:
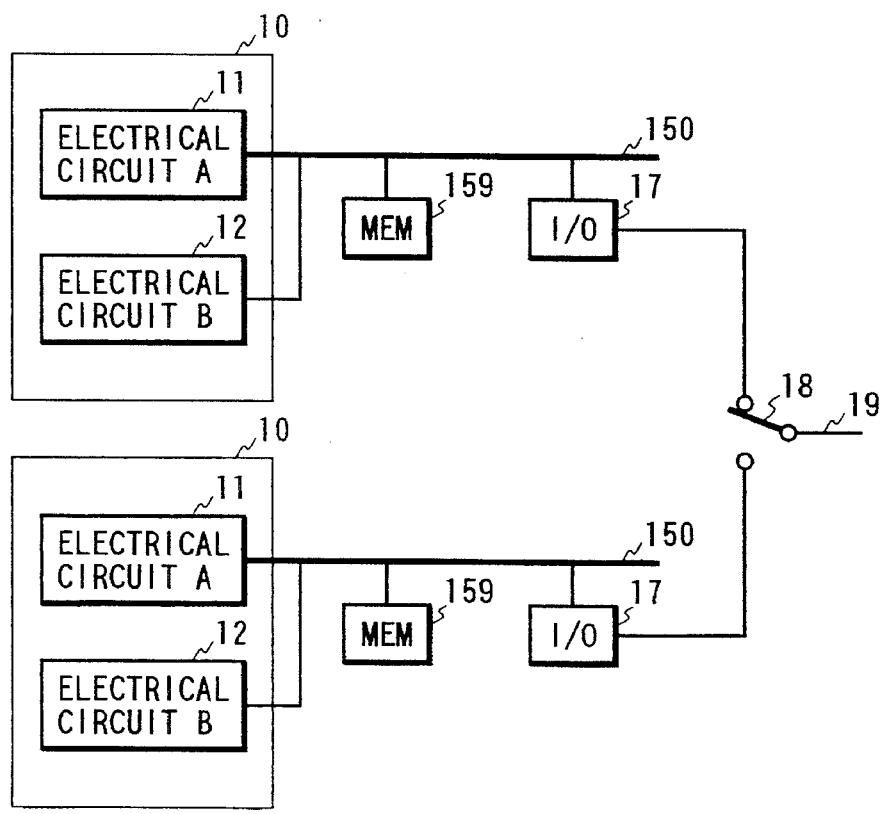
FIG. 10 is a diagram showing the constitution of another example of a continuous operation type fault tolerant system to which the embodiment of the present invention is applied.

FIGS. 9 and 10 show embodiments of a continuous operation system which is accomplished by developing each of the embodiments shown by FIGS. 7 and 8. The final output 19 is gained by switching the outputs of the I/O devices shown FIGS. in 7 and 8 by an output selecting mechanism 18. The output selecting mechanism 18 selects the signal regarded as normal based on error detecting signals output from the comparators 14 and 141 in the electrical device 10.

By the embodiment, a continuous operation system making the most of the feature of securing the normality of output signals from the electrical device 10, can be realized. Furthermore, it is possible to realize a more reliable system by further multiplying the output selecting mechanism.

As mentioned above, by the embodiment, it is not necessary to develop individually the electrical device 10 for each of the simplex bus and the duplex bus since the same electrical device 10 can correspond to both the simplex bus and the duplex bus, which reduces the development cost, and further the production cost, of the electrical device 10. Then, in the simplex bus connection mode, since another remaining port of the two ports to be used in the duplex bus connection mode is used for feeding back output signals to be checked, the reliability of the electrical device can be increased without increasing the terminal numbers. Especially, in the case where the electrical device 10 is mounted in a single package, a cheap package having the few number of pins can be used.

By the present invention, it is not necessary to develop individually the electrical device 10 for each of the simplex bus and the duplex bus since the same electrical device 10 can correspond to the both the simplex bus and the duplex bus, which reduces the development cost, and further the production cost, of the electrical device 10. Then, in the simplex bus connection mode, since another remaining port of the two ports to be used in the duplex bus connection mode is used for feeding back output signals to be checked, the reliability of the electrical device can be increased without increasing the terminal numbers. Especially, in case the electrical device 10 is mounted in a single package, a cheap package having a few number of pins can be used.

What is claimed is:

1. An electrical device to be connected to one or more external buses, comprising:

a plurality of input/output ports of a number no less than the number of external buses to be connected to said input/output ports, wherein if the number of said input/output ports equals the number of said external buses the same signal is output from said plurality of input/output ports, and if the number of said input/output ports, is greater than the number of said external buses, at least one pair of said input/output ports are connected each other, and a signal is output from one of said at least one pair of said input/output ports, and said output signal is collated with a signal to be output, by feeding back said output signal via another one of said at least one pair of said input/output ports.

2. An electrical device, comprising:

a pair of input/output ports connected to two external buses, wherein a same signal is output from said pair of input/output ports if said pair of input/output ports are connected to a duplex bus, and if said pair of input/output ports are connected to a simplex bus, said pair of said input/output ports are connected to each other, and a signal is output from one of said pair of said input/output ports, and said output signal is collated with a signal to be output, by feeding back said output signal via another one of said pair of said input/output ports.

3. An electrical device to be connected to one or more external buses, comprising:

a plurality of input/output ports; and selection means for switching operation modes between a first operation mode in which, in the case of outputting a signal from a first one of said plurality of input/output ports, at least one of remaining ones of said plurality of input/output ports outputs a same signal as said signal output by said first one of said plurality of input/output ports, and a second operation mode in which, in the case of outputting a signal from one of said plurality of input/output ports, said signal output by said one of said plurality of input/output ports is taken in via one of remaining ones of said plurality of input/output ports and collated with a signal which said one of said plurality of input/output ports is to output.

4. An electrical device according to claim 3, wherein said first operation mode is selected when said plurality of input/output ports are connected to an outer duplex bus, and said second operation mode is selected said plurality of input/output ports are connected to an outer non-duplex bus.

5. An electrical device according to claim 1, wherein electrical circuits in said electrical device are made redundant and a fault in one of said redundant electrical circuits is detected by collating outputs of said redundant electrical circuits.

6. An electrical device according to claim 1, being mounted in one of a single box, a single wiring board, a single chip, a single package and a multi-chip module.

7. An electrical device, comprising:

a duplex electrical circuit;

a first input/output port connecting one electrical circuit of said duplex electrical circuit to an outer bus;

a second input/output port connecting another electrical circuit of said duplex electrical circuit to said outer bus if said electrical device is connected to a simplex outer bus and to another bus if said electrical device is connected to a duplex outer bus;

a comparator collating a first signal taken in from a connection line of said first input/output port with a second signal taken in from a connection line of said second input/output port; and a selector selecting one of a permission operation and a prohibition operation to outputting a signal generated by said another electrical circuit from said second input/output port.

8. An electrical device according to claim 7, further including another comparator collating a signal output by said another electrical circuit with said second signal.

9. An electrical device according to claim 7, further including another comparator collating a signal output by said one electrical circuit with a signal output from said another electrical circuit.

10. An electrical device according to claim 7, wherein each one of said first input/output port of said one electrical circuit and said second input/output port of said another electrical circuit is connected to each one of said outer buses in said duplex bus, and said selector selects said permission operation.

11. An electrical device according to claim 7, wherein if said first input/output port of said one electrical circuit is connected to said outer bus, and said first input/output port and said second input/output ports are connected to each other, said selector selects said prohibition operation.

12. A fault tolerant system, comprising:

a plurality of said electrical devices, each said electrical device comprising:

a plurality of input/output ports; and selection means for switching operation modes between a first operation mode in which, in the case of outputting a signal from a first one of said plurality of input/output ports, at least one of remaining ones of said plurality of input/output ports outputs a same signal as said signal output by said first one of said plurality of input/output ports, and a second operation mode in which, in the case of outputting a signal from one of said plurality of input/output ports, said signal output by said one of said plurality of input/output ports is taken in via one of remaining ones of said plurality of input/output ports and collated with a signal which said one of said plurality of input/output ports is to output; and another selector selects outputs of ones of said plurality of said electrical devices, in which a fault is not detected.

13. A fault tolerant system according to claim 12, wherein, in at least one of said plurality of said electrical devices, said first operation mode is selected when said plurality of input/output ports are connected to an outer duplex bus, and said second operation mode is selected when said plurality of input/output ports are connected to a non-duplex bus.

14. A fault tolerant system according to claim 12, wherein, in at least one of said plurality of said electrical devices, electrical circuits in said electrical device are made redundant and a fault in said redundant electrical circuits is detected by collating outputs of said redundant electrical circuits.

15. A fault tolerant system according to claim 12, wherein, at least one of said plurality of said electrical devices is mounted in one of a single box, a single wiring board, a single chip, a single package and a multi-chip module.

16. A fault tolerant system, comprising:

a plurality of said electrical devices each said electrical device comprising;

a duplex electrical circuit;

a first input/output port connecting one electrical circuit of said duplex electrical circuit to an outer bus;

a second input/output port connecting another electrical circuit of said duplex electrical circuit to said outer bus if said electrical device is connected to a simplex outer bus and to another bus if said electrical device is connected to a duplex outer bus;

a comparator collating first signal taken in from a connection line of said first input/output port with a second signal taken in from a connection line of said second input/output port; and a selector selecting one of a permission operation and a prohibition operation to outputting a signal generated by said another electrical circuit from said second input/output port; and anther selector selects outputs of ones of said plurality of said electrical devices, in which a fault is not detected.

17. A fault tolerant system according to claim 16, wherein in at least one of said plurality of said electrical devices, said first operation mode is selected when said plurality of input/output ports are connected to an outer duplex bus, and said second operation mode is selected when plurality of input/output ports are connected to an outer non-duplex bus.

18. A fault tolerant system according to claim 16, wherein, in at least one of said plurality of said electrical devices, electrical circuits in said electrical device are made redundant and a fault in said redundant electrical circuits is detected by collating outputs of said redundant electrical circuits.

19. A fault tolerant system according to claim 16, wherein, at least one of said plurality of said electrical devices is mounted in one of a single box, a single wiring board, a single chip, a single package and a multi-chip module.

* * * * *

UNITED STATES PATENT AND TRADEMARK OFFICE
CERTIFICATE OF CORRECTION

PATENT NO. : 5,612,946
DATED : 18 March 1997
INVENTOR(S) : Nobuyasu KANEKAWA et al.

It is certified that error appears in the above-indentified patent and that said Letters Patent is hereby corrected as shown below:

| Column | Line | |
|---|---|---|
| 2 | 15 | Change "increasing" to --increase--. |
| 2 | 64 | Change "port" to --ports--. |
| 3 | 1 | Change "part" to --port--. |
| 3 | 44 | Before "reference" insert --with--. |
| 3 | 57 | After "external" delete "the fault"; after "indication of" insert --the fault--. |
| 5 | 60 | After "used" delete "by". |
| 6 | 10 | After "shown" insert --in--. |

Signed and Sealed this

Twenty-sixth Day of August, 1997

Attest:

BRUCE LEHMAN

*Attesting Officer*   *Commissioner of Patents and Trademarks*